Dec. 13, 1960 R. B. NAWMAN 2,964,146

TELEPHONE BOOTH CONSTRUCTION

Filed Feb. 7, 1955 4 Sheets-Sheet 1

INVENTOR.
Rollie B. Nawman
BY Fisher and Swain
ATTORNEYS

INVENTOR.
Rollie B. Nawman
BY Flehr and Swain
ATTORNEYS

TELEPHONE BOOTH CONSTRUCTION

Filed Feb. 7, 1955 4 Sheets-Sheet 3

INVENTOR.
Rollie B. Nawman
BY Flehr and Swain
ATTORNEYS

Dec. 13, 1960 R. B. NAWMAN 2,964,146

TELEPHONE BOOTH CONSTRUCTION

Filed Feb. 7, 1955 4 Sheets-Sheet 4

INVENTOR.
Rollie B. Nawman

BY [signature]

ATTORNEYS

United States Patent Office 2,964,146

Patented Dec. 13, 1960

2,964,146

TELEPHONE BOOTH CONSTRUCTION

Rollie B. Nawman, Oakland, Calif., assignor to Benner-Nawman, Inc., Oakland, Calif., a corporation of California Filed Feb. 7, 1955, Ser. No. 486,507

2 Claims. (Cl. 189—34)

This invention relates to structures which are adapted to be quickly and easily assembled in the field and, particularly, in the preferred embodiment illustrated herein, relates to the construction of telephone booths which are adapted to be erected by relatively inexperienced personnel from substantially standard extrusions, panels and other standardized elements.

In the past many attempts have been made to provide easily erected units of this kind and various methods and apparatus and construction elements have been utilized. Small units have been made of wood, steel and glass and various combinations thereof but they have all met with various difficulties.

For example, in the construction of telephone booths it is necessary that the booth be sufficiently light when in knockdown form that its various components may be easily handled and assembled by one or at most two individuals. When the elements are large and unwieldy or when it has been necessary that they be held in a predetermined position while they are bolted, nailed, riveted or welded, ease of construction is lost.

Furthermore the utilization of components in the previously described constructions has required a great number of elements of various kinds and although these devices have contemplated the utilization of untrained or unskilled personnel, they have, as a matter of fact, required the utmost by way of skill in their erection.

Furthermore the manufacture of the component parts has required rather complex assembly of parts and has required, for the manufacture of each component for the knock-down assembly, considerable in the way of manufacturing technique and know-how and a considerable number of parts all of which must be fitted with a high degree of accuracy to maintain the panes of glass in waterproof condition and to provide a structure which is relatively rigid, easily assembled, and, when assembled difficult to disassemble except by trained personnel who are familiar with its erection. This latter feature is particularly important in the construction of telephone booths where substantial sums of money and valuable equipment are maintained and furthermore where vandalism seems to be rampant.

It has been found, for example, that in the event any of the fastening or securing means are exposed once the assembly has been erected, that point is immediately attacked by vandals with the result that the assembly becomes relatively valueless and is broken into, or that it is weakened and must be repaired.

It is an object of this invention to provide a finished construction which is relatively vandal-proof and which may be only disassembled by persons who are skilled in the disassembly of such items.

A further object of this invention is to provide a device which may be assembled from various components by those who are relatively unskilled and particularly by one individual.

It is a further object of this invention to provide a booth of this kind which may be constructed of substantially similar panels which, in turn, are constructed of substantially identical components.

It is a still further object of this invention to provide panels which may be easily manufactured at a central point of the fewest possible number of components and by unskilled personnel.

A further object of this invention is to provide a device which, when the same has been assembled, presents the fewest number of exposed fastening or securing points which may be attacked by vandals.

Other objects and advantages of the present invention will appear from the following specification taken in conjunction with the accompanying drawings, in which.

Figures 1, 2, 3:
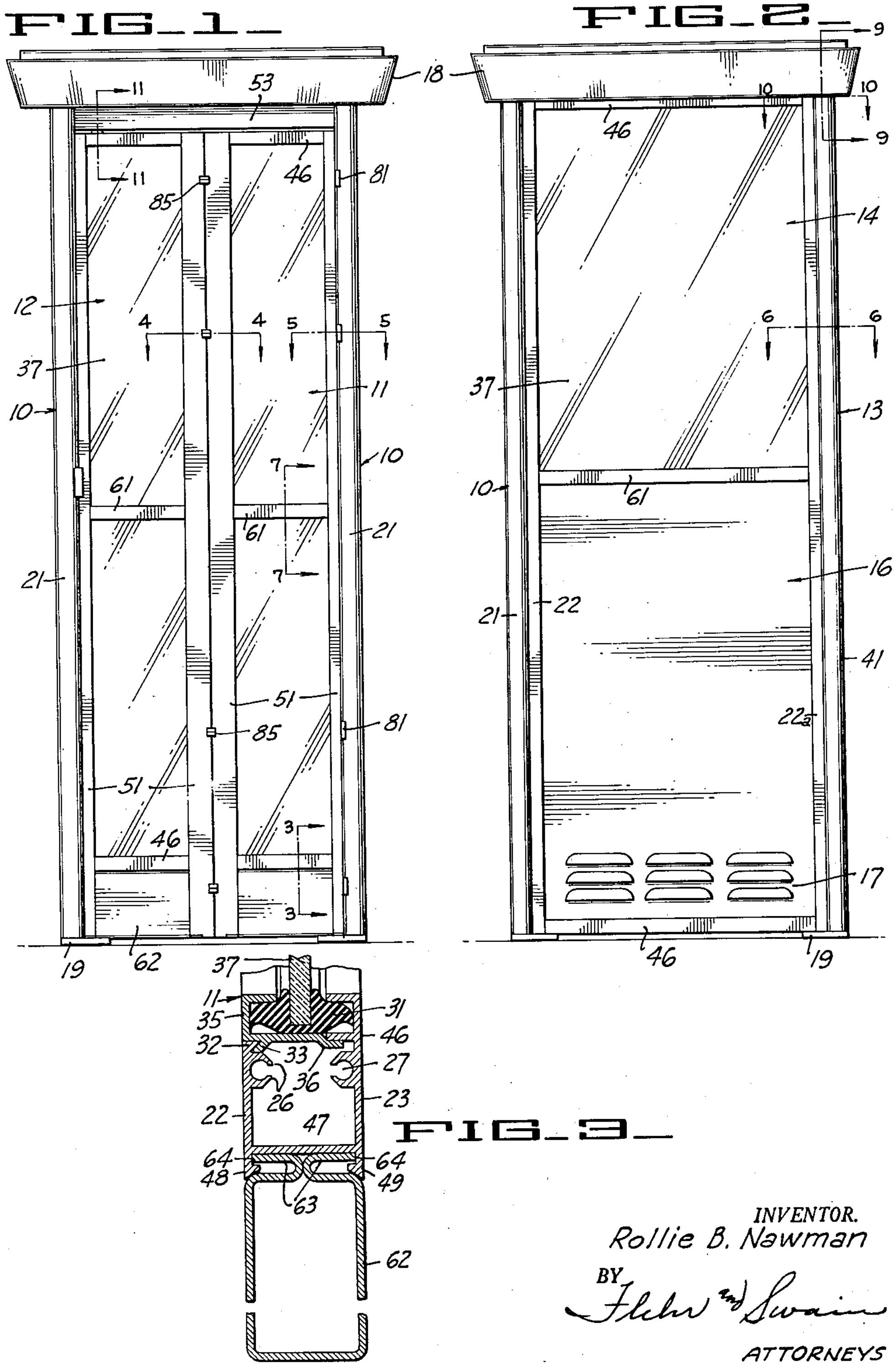
Figure 1 represents a front view of a telephone booth incorporating my invention.
Figure 2 represents a side view of a telephone booth incorporating my invention.
Figure 3 represents a detail taken along the line 3—3 of Figure 1.

As illustrated particularly in Figures 1 and 2 my booth consists generally of a four-sided structure provided with a roof. The front side, as illustrated in Figure 1, consists generally of a pair of corner posts 10 which are substantially identical and which support a door made of two substantially identical panels 11 and 12, the panel 11 being hung from one of the corner posts 10 and the two panels 11 and 12 being hinged in the manner illustrated in Figure 4. The sides of the telephone booth, as illustrated in Figure 2, and the back are substantially identical and consist of the corner posts 10 and 13 and an upper glass portion 14 and a lower opaque portion 16 which is provided with ventilating openings 17. A top 18 is superimposed on the entire assembly which is secured to a base 19 by means of bolts which are secured in the corner posts 10 and 13.

Figures 5, 7:
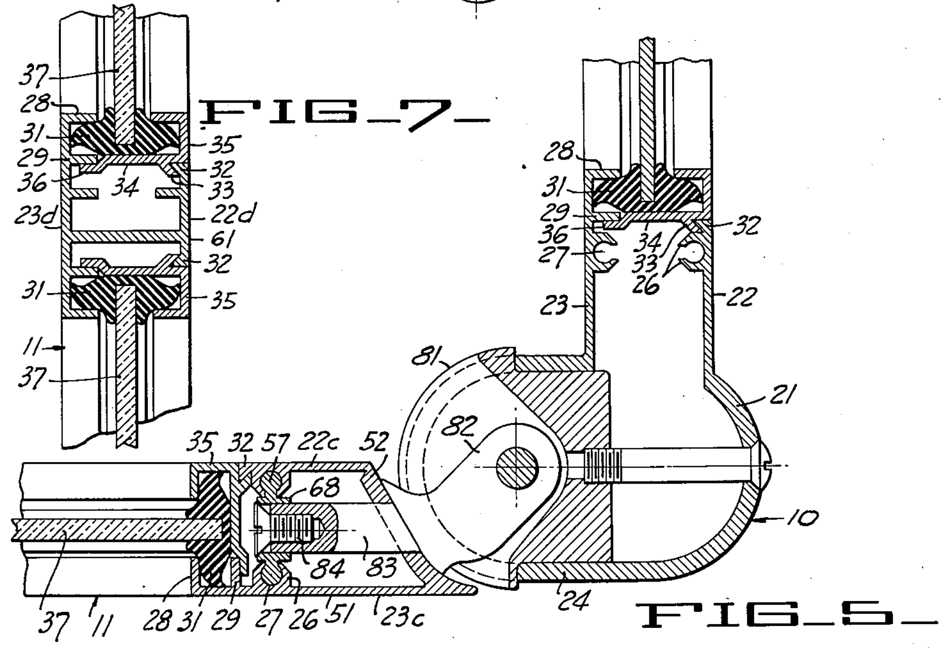
Figure 5 illustrates a cross-sectional detail taken along the line 5—5 of Figure 1 and illustrates the method of hanging the doors to the corner posts.
Figure 7 is a view taken along the line 7—7 of Figure 1.
Figures 10, 11, 12, 13, 14:
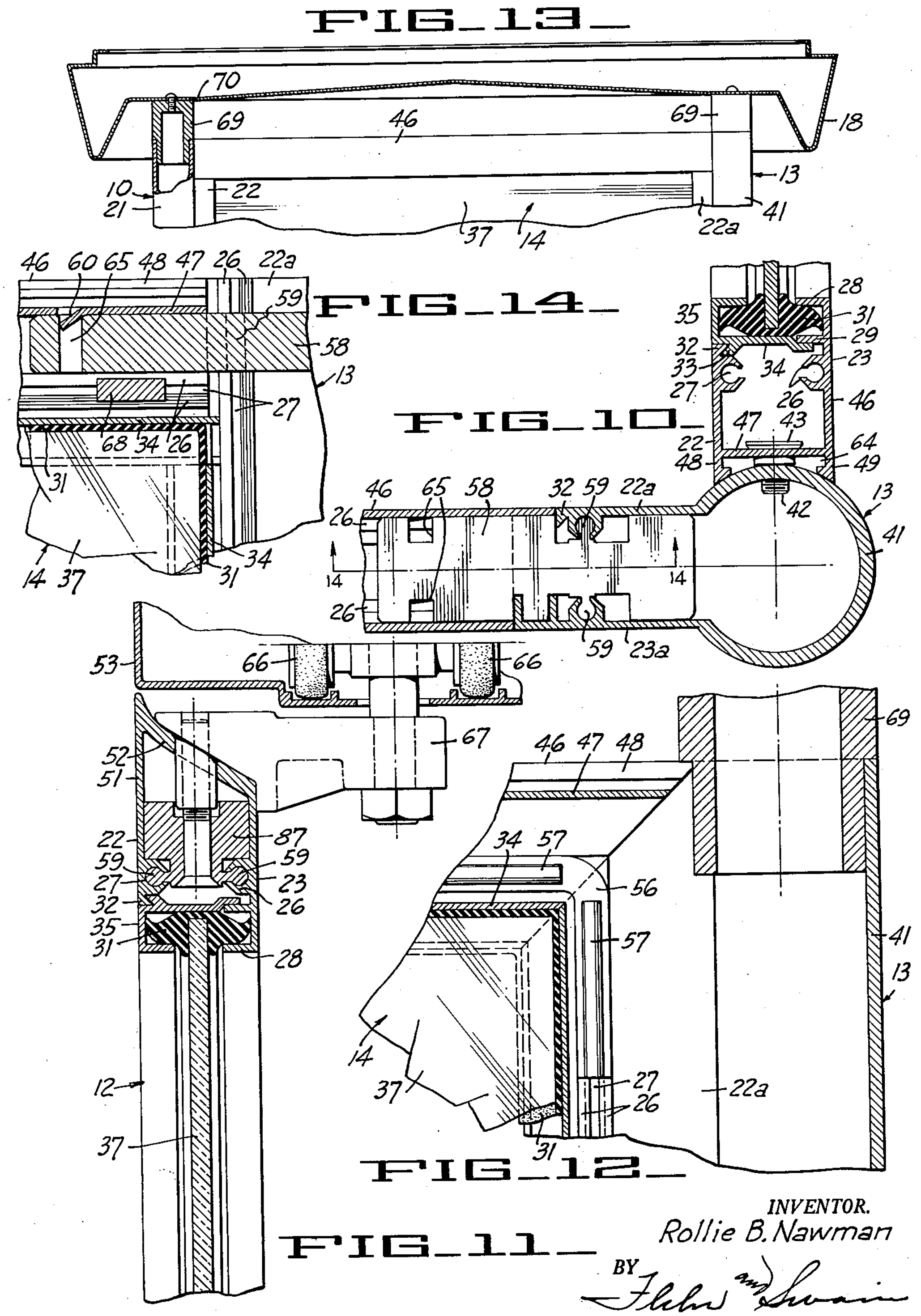
Figure 10 is a cross-sectional view taken along the line 10—10 of Figure 2.
Figure 11 illustrates a cross-sectional detail taken along the line 11—11 of Figure 1.
Figure 12 illustrates one modification of a corner construction.
Figure 13 represents the top assembly of a telephone booth incorporating my invention.
Figure 14 represents a view taken along the line 14—14 of Figure 10 and illustrates, together with Figure 10, the manner in which horizontal and vertical top and side panels are secured.
Figure 15:
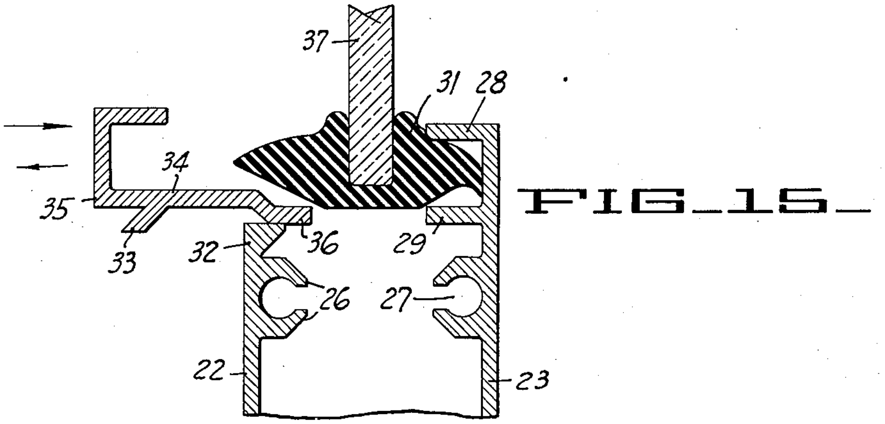
Figures 15, 16 and 17 illustrates the manner of inserting and securing a glass or metal panel in my construction and illustrates the several steps of positioning and locking the same.
Figure 16:
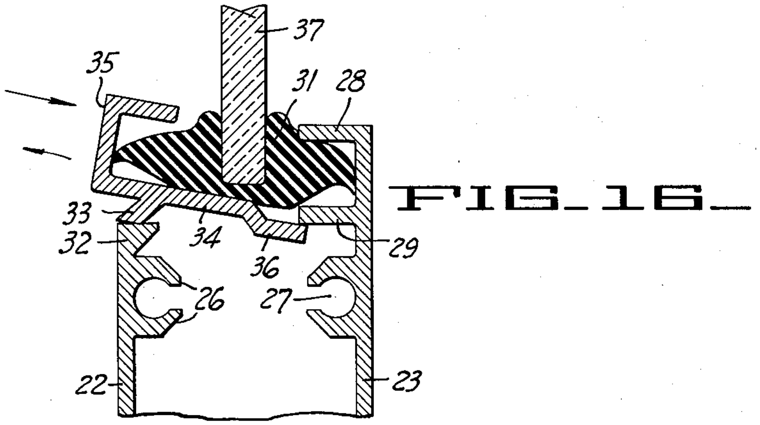
Figure 17:
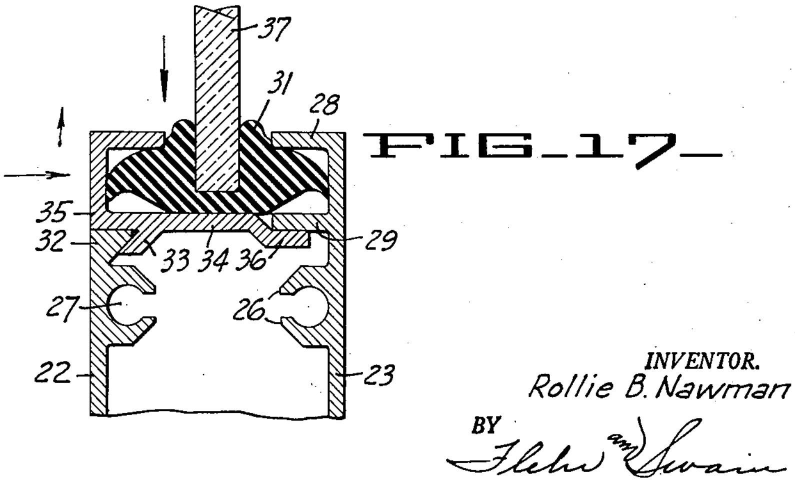

The corner posts 10 are illustrated particularly in Figure 5 and consist of an extruded post portion 21 which is generally formed as shown and which is provided with a pair of parallel walls 22 and 23 which extend generally at right angles to the flattened surface 24 of the post 21. The parallel walls 22 and 23 are formed generally as illustrated in Figure 5 and are provided with identical inwardly extending lips 26 which form opposed parallel cylindrically shaped channels or keyways 27 whose purpose will more fully hereinafter be explained. The inner wall 23 is also provided with inwardly extending ribs 28 and 29 which form a seat for one side edge of the rubber glazing strip 31. The wall 22 is provided with an overhanging lip 32 which is adapted to interlock with an angularly disposed rib 33 upon the metallic glazing strip retainer or member 35 which is illustrated more particularly in Figure 9 and Figures 15, 16 and 17. When the metallic glazing strip retainer 35 is in the position illustrated in Figure 5, for example, it is retained by engagement of the lip 32 and the rib 33 and by the overlapping engagement of its bottom wall 36 with the rib 29. When in this position, retainer 35 serves to compress the deformable rubber molding strip 31 which, because of its resiliency, may be compressed but which will expand when released and hold the entire assembly in place. The strip 31 has a massive body portion and longitudinal laterally extending side edges. The body is formed with a longitudinal groove which is adapted to seat one edge of a plane-like member such as a glass pane 37. It will be noted that the lower wall 36 of the metallic glazing strip 35 when in the position illustrated in Figure 5 (see also Figure 17), does not engage the side wall 23 but is positioned a slight distance therefrom permitting the member 35 to be urged to the left, as illustrated in Figures 5 and 10, against the resiliency of the member 31 until the cooperating angularly disposed rib 33 becomes disengaged from the lip 32 so that the retainer 35 may be removed in entirety. However once the assembly illustrated in Figures 5 and 17 is completed, the resiliency of the member 31 serves to hold it indefinitely and without the use of further fastening members. It should be pointed out that the same method of holding the glass panels 37 is utilized in connection with the assemblies illustrated in Figures 3, 4, 6, 7, 10 and 11. This system of holding the glass and an opaque panel (as illustrated in Figure 10) permits the utilization of a single type of metallic glazing strip retainer 35 for glass panels of the type illustrated at 14 and metallic panels of the type illustrated at 16. Thus I use the same type of glazing strip 31 and retainer 35 wherever flat thin wall panels are to be incorporated in my construction. The ease of slipping the bottom wall 36 under the rib 29 against the pressure of the resilient glazing strip 31 until the rib 33 is ready to be positioned within the groove created by the lip 32 permits simple construction by unskilled mechanics. However the completed assembly presents a completely flush surface which, to the uninitiated, and particularly to the vandal, appears to have no fastening means thereby creating in the vandal's mind the impression that the same are concealed and thus inaccessible. This serves to defeat a substantial percentage of vandalism. Yet, when a panel of glass 37, for example, is broken, a skilled mechanic may simply urge the retainer strip 35 to the left as illustrated in Figures 15 to 17 against the resiliency of the member 31 until the ribs 32 and 33 are disengaged and, at the same time, serve to pivot the strip 35 about the point of contact with the lip 32 and rib 33 whereby the lower wall 36 becomes disengaged from the rib 29 so that the entire assembly may be removed. It will be noted that the lower wall 36 is provided with a portion 34 which is adapted to engage and support the lower surface of the strip 31.

Figure 6:
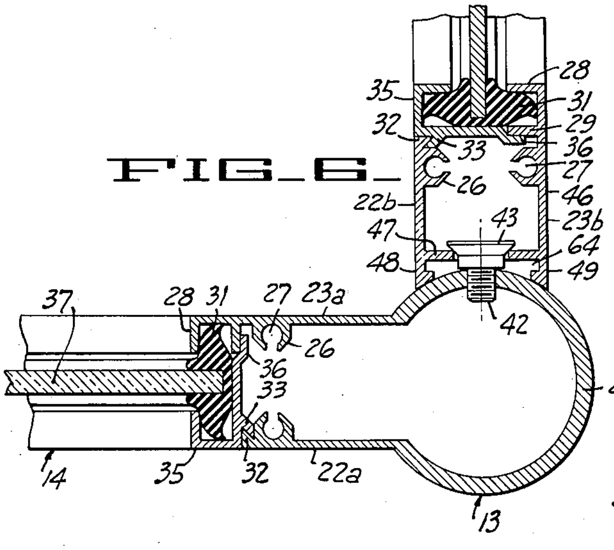
Figure 6 is a view taken along the line 6—6 of Figure 2 and shows a rear corner construction.
Figure 8:
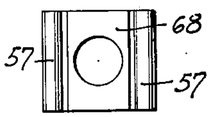
Figure 8 is a view of one of the components shown particularly in Figure 4, which is used to hold various of the elements, including, particularly, a hinge in position.
Figure 9:
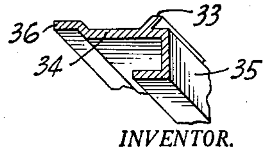
Figure 9 is a three-quarter view of the member illustrated in Figures 3, 4, 5, 6, 7, 10 and 11 and hereinafter referred to as the glazing strip.

The rear corner assemblies consist of a pair of extrusions of the type illustrated in Figure 6 in which a generally tubular extruded body 41 is provided with a pair of parallel outwardly extending walls 23*a* and 22*a* which are provided with lips, ribs, etc., as has previously been described in connection with Figure 5 and which, it will be noted, serve to perform the same function. However, the body 41 is tapped to receive screws 42 which have flared heads 43. The screws 42 serve to hold a third extruded H-shaped member 46 to the member 41. The member 46 is provided with parallel walls 22*b* and 23*b* which are substantially identical to the walls 22 and 23 illustrated in Figure 5 and which perform substantially the same purpose. However the member 46 is also provided with an interconnecting wall 47 and the projecting walls 48 and 49. When the corner posts 13 illustrated in Figure 6 are assembled as illustrated in that figure, they, too, present on all surfaces an assembly on which there are no exposed connecting elements. However, assembly and disassembly is accomplished simply by means of the screw 42 which may either be inserted through a simple orifice in the wall 47 or which may be inserted in a keyhole type orifice whereby the head of the member may be inserted in the enlarged portion of the orifice and the member slid to the point where the head engages the smaller portion of the orifice. This type of construction is well known.

Members 46 form not only the vertical portions illustrated in Figure 6 but also the horizontal members shown Figures 1, 2, 10, 12, 13 and 14.

Figure 4:
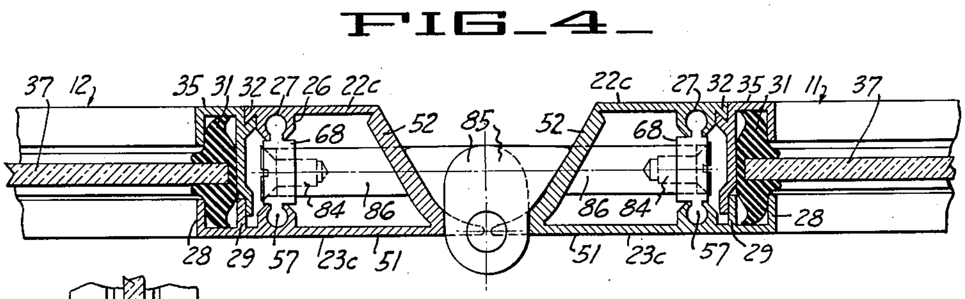
Figure 4 represents a cross-sectional detail taken along the line 4—4 of Figure 1 and showing the method of hinging the doors.

As also indicated in Figures 4 and 5 I have provided a type of extruded body 51 which is provided with parallel walls 22*c* and 23*c* which are similar to and adapted to perform the same function as the walls 22 and 23 in Figure 5. This extrusion is formed in substantially the same way as members 21, 41 and 46, with the exception that the walls 22*c* and 23*c* are joined by an obliquely slanting rear wall 52. Extrusions 51 are identical and form vertical side edges of the door panels as illustrated in Figure 1, and the top cross bar 53.

The rear corner posts are constructed as illustrated in Figure 6 and the front corner posts are constructed as illustrated in Figure 5.

The centrally disposed horizontal members 61 are illustrated in detail in Figure 7 and consist primarily of parallel walls 22*d* and 23*d* which are provided with the lips and ribs previously described herein in connection with Figure 5 and which are adapted to accommodate glass and the glazing strips 31 and 35.

As illustrated in Figure 3 the lower portion of the doors 11 and 12 consist of a formed member 62 which is provided with opposed lips 63 which fit in parallel grooves 64 in the member 46 and which serves to form the lower portion of the door which is most often kicked or engaged by stones, etc.

As illustrated in Figure 11 the portion 51 is provided with a pair of hangers 66 which are adapted to engage a cross member 67 to properly guide a door from full opened to full closed position.

The vertical members 21, 41, 46 and 51 and the horizontal members 46 are joined at the corners in one of two ways.

As illustrated in Figure 12, the vertical and horizontal members may be mitred. Specifically the parallel walls 22 and 23 of the member 21 and the walls 22*a* and 23*a* of the horizontal members 46 are mitre cut with the result that the edges of the mitred portions 22 and 22*a* and 23 and 23*a* are in contact. The cylindrically shaped channels in the channels 27 formed on the members 22, 22*a*, 23 and 23*a*, are at right angles to each other. I provide a preformed angle member 56 which is provided with parallel outwardly extending rod-like portions or keys 57 which are adapted to be received within and accommodated by the cylindrically shaped channels or keyways 27 formed by the lips 26. The member 56 is rigid and the keys 57 thereon engage the parallel channels 27 and thus form a rigid corner. The lips 26 may be deformed by crimping or any other suitable means to form a tight bond with the members 68.

The second method of forming corners is that illustrated generally in Figure 14 in which the vertical members 21 and 41 and the horizontal members 46 are square cut at their ends and the ends of the member 46 abut the side edges of the members 21 and 41. I provide a member 58 which is adapted to be accommodated between the walls 22b and 23b and the web 47 and the lips 26. This device is provided with a pair of rod-like lugs 59 which are adapted to be received within the cylindrically shaped channels 27 of the vertical member. The main body of the device 58 may also extend further into the area created by the walls 22 and 23 and thus serve to further enhance the strength of the assembly. The member is prevented from moving longitudinally into and out of the horizontal member 46 by crimping a pair of lugs 60 into recesses 65 within the body member 58. It will be seen that lateral movement of either the member 21 or 46 is prevented by the lugs 60 and the seating of the lugs 59 in the cylindrically shaped channels 27. Other movement is not likely to occur because there is no pressure exerted in a vertical direction as viewed in Figure 14.

As illustrated generally in Figure 12, the corner posts are provided with cast upper members 69, also shown in Figure 13, to which a pre-formed top 70 may be bolted or otherwise secured.

It is apparent from the foregoing that there are only a few principal structural members, these are members 21, 35, 41, 46, 51, 58, 61 and 68.

The members 21 form the two front corner posts. The members 41 and 46 form the two rear corner posts. The members 46 form the side edges of the rear panel and are also adapted to form the upper and lower horizontal edges of the doors and the upper and lower horizontal edges of the side panels. The members 61 form the centrally disposed horizontal portions of both the doors and the panels while the members 51 form the side members of the doors. All of these members, with the exception of the member 35, are open extrusions. However, by virtue of the parallel spaced lips 26 and the spaced parallel opposed channels 27 which are adapted to accommodate pre-formed members 68 all of the members become, in effect, box channels. It is by the utilization of the pre-formed members 68 which are adapted to cooperate with the substantially tubular parallel sections 27 that a rigid box is obtained and that the corner constructions are made possible.

It is apparent, therefore, that I have provided a simple type of construction element which consists essentially of parallel spaced walls 22 and 23 on specific structural shapes as illustrated by the portions 21, 41, 46, 51 and 61 to form three sides of a box member. Those ends of the parallel walls remote from the structural shape form a pair of opposed parallel cylindrical recesses adapted to receive a form which may be slipped in lengthwise of the parallel tubular recesses to form a box. Beyond said tubular parallel recesses there is provided three pre-formed parallel lips adapted to engage a uniform type of rigid glazing member, of the type previously described in connection with Figure 5.

As illustrated throughout there are numerous ways in which other fixtures may be attached to or made to accommodate themselves to my pre-formed extrusions. For example, as indicated in Figure 5, a hinge element may be provided by slotting the member 21 so that the same may accommodate a housing member 81 which is adapted to receive a male portion 82 of a hinge. The male portion 82 of the hinge is provided with an extension 83 which may be passed through the orifice in the wall 52 and then secured by means of a screw 84 to member 68 which is held in position in the manner previously described.

In the same manner a hinge may be provided between the doors as illustrated in Figure 4. The two portions of the hinge are provided with extending parts 86 which pass through orifices in the walls 52 and which are secured to members 68 by means of screws 84. In addition, and as shown particularly in Figure 11, hangers 67 or other devices may be secured to members 87 of the type illustrated at 46. Moreover, as shown in Figure 3, other shapes may be secured to the member 46.

I claim:

1. In a structural assembly of the character described, a structural member comprising first and second connected side walls having free parallel margins, a retaining strip formed of resilient material having a longitudinal groove adapted to seat one edge of a plane-like member, said strip having longitudinal laterally extending side edges, the free margin of said first side wall having outer and inner rib-like portions forming a first recess seating one longitudinal edge of the retaining strip, said second side wall being formed with an undercut groove and a second relatively rigid structural member providing a second recess seating the other side edge of the retaining strip, said second member having a rib seated in said undercut groove to provide an interlocking engagement with said second side wall, said second member having a free portion engaging the surface of said strip on the side opposite the longitudinal groove, the free portion having an offset portion underlying the inner rib, the laterally extending side edges of the strip being compressed between said first side wall and said second member whereby said second member is urged and retained in interlocking relationship with said second side wall, the side edges being in engagement with the remote surfaces of the recesses.

2. In a structural assembly of the character described, a structural member comprising first and second connected side walls having free parallel margins, a retaining strip formed of resilient material with a massive body portion and longitudinal laterally extending side edges, the massive body portion having longitudinal grooves adapted to seat one edge of a plane-like member, the free margin of said first side wall having outer and inner rib-like portions forming a first recess seating one longitudinal edge of the retaining strip, said second side wall being formed with an undercut groove and a second relatively rigid structural metal member providing a second recess seating the other side edge of the retaining strip, said second member having a free wall, the free wall having an offset portion which overlaps and underlies the inner rib-like portion forming the first recess, said second member having a rib seated in said undercut groove to provide an interlocking engagement with said side wall, the interlocking engagement being in the same general plane as the offset portion, said retaining strip being compressed between said first side wall and said second member whereby said second member is urged and retained in interlocking relationship with said second side wall, the side edges of the retaining member extending into said recesses and engaging the remote surfaces forming the recesses, the engagement of the side edges of the retaining strip by the recesses preventing rotational movement of the retaining strip.

References Cited in the file of this patent

UNITED STATES PATENTS

| | | |
|---|---|---|
| 111,128 | Linscott | Jan. 24, 1871 |
| 2,081,722 | Weinzierl | May 25, 1937 |
| 2,101,349 | Sharp | Dec. 7, 1937 |
| 2,119,685 | Peremi et al. | June 7, 1938 |
| 2,395,673 | Krantz | Feb. 26, 1946 |
| 2,546,962 | Best | Apr. 3, 1951 |
| 2,590,929 | Bush | Apr. 1, 1952 |
| 2,632,535 | Clerk | Mar. 24, 1953 |
| 2,714,432 | Blanchard | Aug. 2, 1955 |
| 2,736,403 | Gwynne | Feb. 28, 1956 |

FOREIGN PATENTS

| | | |
|---|---|---|
| 605,676 | Great Britain | July 28, 1948 |
| 257,654 | Switzerland | Apr. 1, 1949 |